(12) United States Patent
Cain et al.

(10) Patent No.: US 6,557,044 B1
(45) Date of Patent: Apr. 29, 2003

(54) METHOD AND APPARATUS FOR EXCHANGE OF ROUTING DATABASE INFORMATION

(75) Inventors: Brad Cain, Billerica, MA (US); Thomas Hardjono, Billerica, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/322,905

(22) Filed: Jun. 1, 1999

(51) Int. Cl.[7] ............................................. G06F 15/173
(52) U.S. Cl. ....................................... 709/242; 709/238
(58) Field of Search ................................. 709/238, 242, 709/243; 370/395, 397, 395.3, 395.31, 395.32; 379/219, 220.01, 221.14, 377; 707/203, 200, 201, 202, 204

(56) References Cited

U.S. PATENT DOCUMENTS

| | | | |
|---|---|---|---|
| RE31,182 E | | 3/1983 | Crager et al. |
| 5,473,603 A | * | 12/1995 | Iwata .......................... 370/426 |
| 5,530,806 A | * | 6/1996 | Condon et al. .............. 370/397 |
| 5,633,858 A | * | 5/1997 | Chang et al. ................ 370/392 |
| 5,751,971 A | | 5/1998 | Dobbins et al. |
| 5,764,741 A | | 6/1998 | Barak |
| 5,914,953 A | | 6/1999 | Krause et al. |
| 5,987,521 A | * | 11/1999 | Arrowood et al. .......... 709/243 |
| 5,991,388 A | | 11/1999 | Sonnenberg |
| 5,999,536 A | | 12/1999 | Kawafuji et al. |
| 6,014,380 A | | 1/2000 | Hendel et al. |
| 6,023,563 A | | 2/2000 | Shani |
| 6,064,726 A | | 5/2000 | Whited |
| 6,069,895 A | | 5/2000 | Ayandeh |
| 6,075,852 A | | 6/2000 | Ashworth et al. |
| 6,081,524 A | | 6/2000 | Chase et al. |

OTHER PUBLICATIONS

Moy, J.; "OSPF 2", Request for Comments (RFC) 1583, Mar. 1994.*

* cited by examiner

*Primary Examiner*—Mehmet B. Geckil
*Assistant Examiner*—Marc D. Thompson
(74) *Attorney, Agent, or Firm*—Blakely Sokoloff Taylor & Zafman LLP

(57) ABSTRACT

A route table providing a list of pointers to checksum values computed across routes of interest to a particular protocol. A method of updating the route table when a route is changed and also updating the checksum values is further described. Updates to the checksum value may be done using an exclusive OR process allowing for relatively fast, incremental updates to the checksum value.

12 Claims, 5 Drawing Sheets

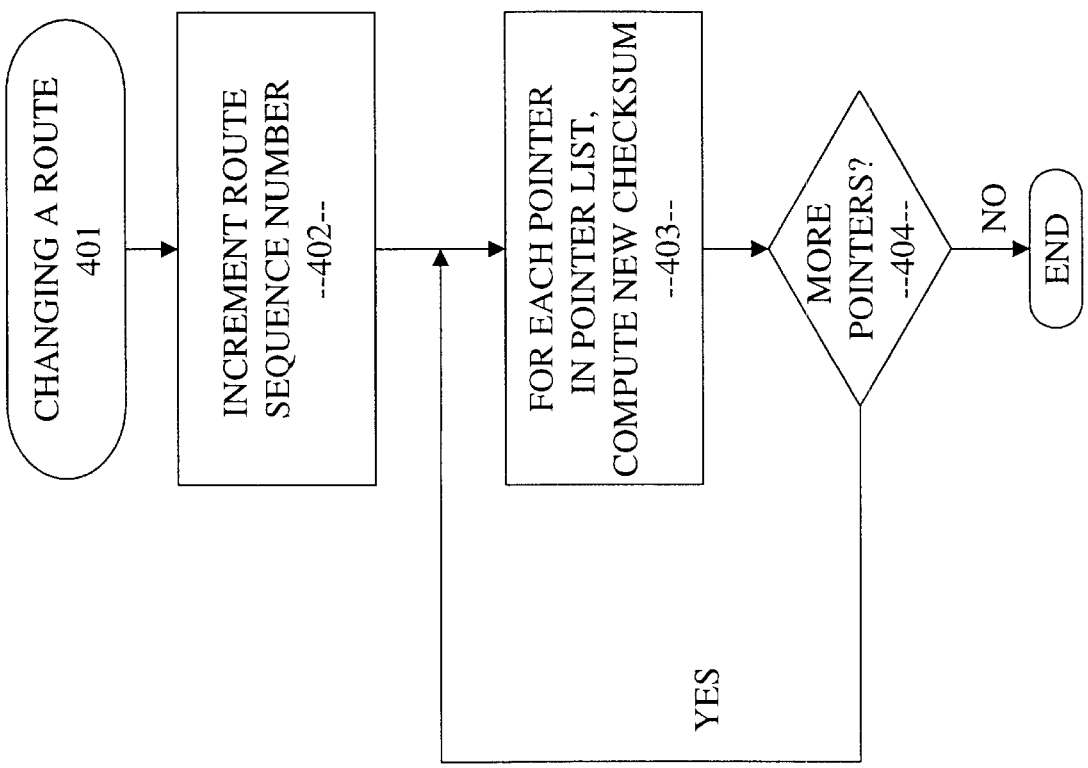

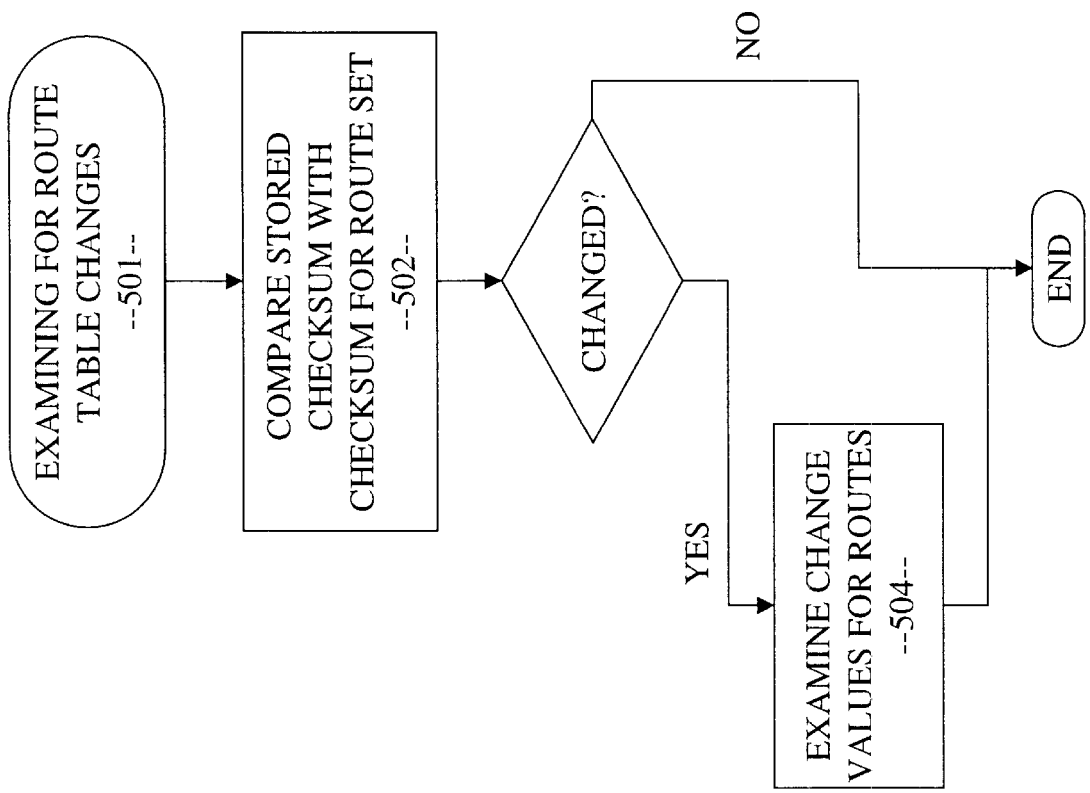

US 6,557,044 B1

METHOD AND APPARATUS FOR EXCHANGE OF ROUTING DATABASE INFORMATION

BACKGROUND OF THE INVENTION

1. Field of the Invention

The present invention relates to the field networking and, more particularly, to the field of routers in networks.

2. Description of the Related Art

Networks provide for transmission of information from a source to a destination over a particular route. The information is transmitted along the route through routers. Typically, each router has knowledge of various routes available in the network and this knowledge is stored in a route database or route table. The information is transmitted in accordance with a particular protocol and routers in the network may support any of a number of protocols. Thus, the router may store multiple routes which are available using multiple protocols.

An example of a routing table is shown in FIG. 1 which illustrates a table 100 having a plurality of entries, one for each of routes R1 to R5, 101. Each entry includes a sequence number 103 and other information 102. The other information may include, for example, next hop information (i.e., identification of the next router in the route), various metrics which describe the route (e.g., number of hops, bandwidth), and route preference information.

The sequence number 103 is changed each time there is a change to the route. Further, each time any route in the table changes, a table sequence number 105 is updated. In this way, as will be seen, it can be easily determined whether any route in the table has changed since the last time the table was examined. If there has been a change, individual routes are examined to determine which routes changed.

It is desirable to exchange routes between the various protocols. This is typically done via the central routing table 100 using either a polling or interrupt mechanism. For example, using the polling method, periodically, the table is queried by each protocol to determine if there have been changes to the various routes from other protocols which are of interest (in the interrupt type mechanism, an interrupt occurs when routes are changed). Initially, the table sequence number 105 is checked to see if it has changed since the last time the table was polled. If it has not changed, no changes have been made to the routes of interest. If the table sequence number 105 has changed, then sequence numbers of the individual routes of interest are checked to determine if they have changed.

Unfortunately, if just one route has changed, even one that is not of interest, all routes must still be checked. This can, in a typical implementation having thousands (even hundreds of thousands) of routes, be computationally burdensome. The burden is increased because in a typical implementation, the polling process may be required to take place quite frequently (e.g., every several seconds).

Thus, it would be desirable to develop a system in which the overhead burden of determining which routes in routing table have changed is reduced.

SUMMARY OF THE INVENTION

A route table providing a list of pointers to checksum values computed across routes of interest to a particular protocol is described. When the protocol wishes to determine whether routes in the table have changed since the last time the table was examined, the checksum value may be examined to determine if it has changed since the last time the table was examined. If the checksum value has changed, individual routes of interest are examined to determine which route or routes of interest have changed.

BRIEF DESCRIPTION OF THE DRAWINGS

FIG. 4 illustrates a method of updating checksums and sequence numbers as may be utilized by an embodiment of the present invention.

FIG. 5 illustrates a method of examining a route table for changes to routes of interest as may be utilized by an embodiment of the present invention.

Figure 1:
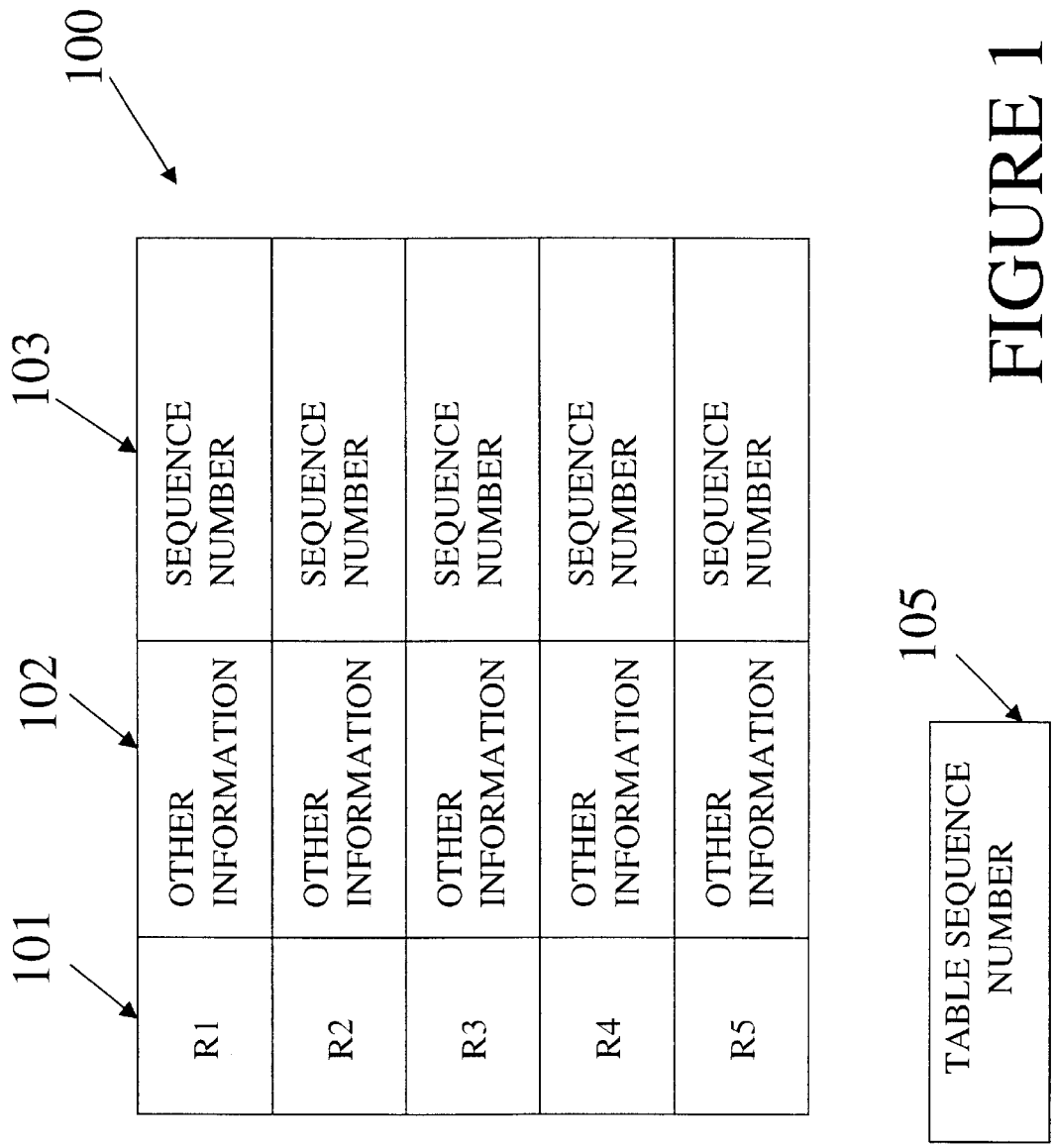
FIG. 1 illustrates a prior art routing table.
Figure 3:
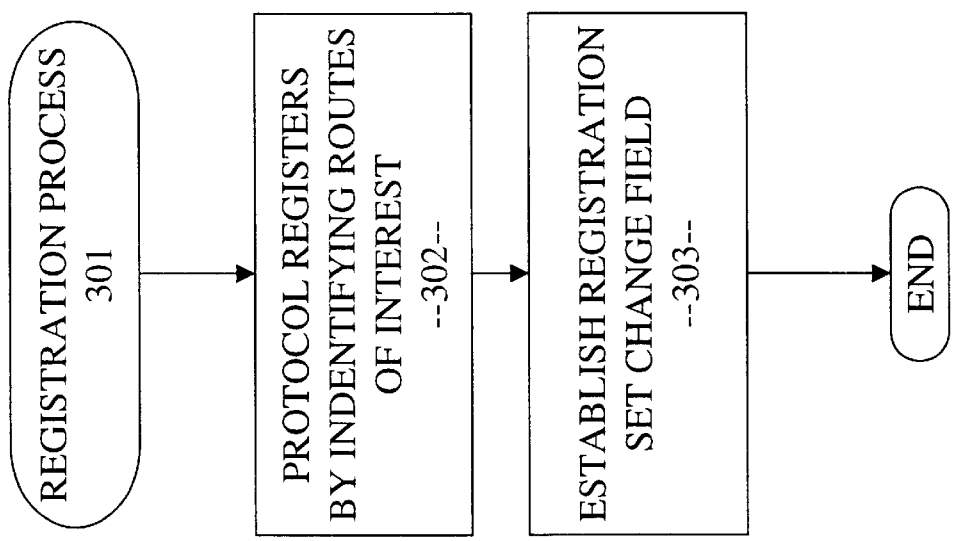
FIG. 3 illustrates a method of registering sets of routes of interest as may be utilized by an embodiment of the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

Figure 2:
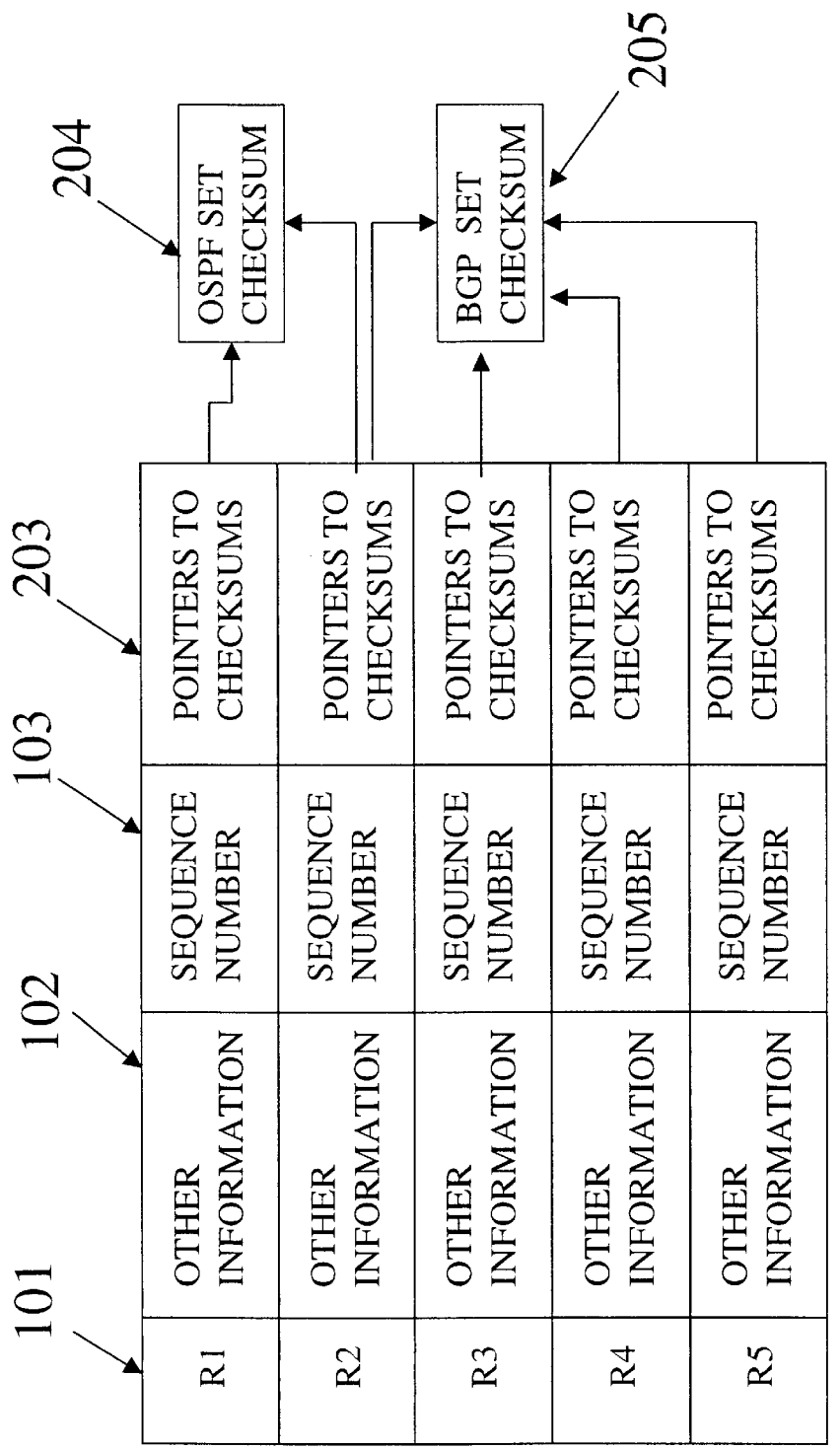
FIG. 2 illustrates a routing table as may be implemented by an embodiment of the present invention.

As was discussed in the background section, it is desirable to reduce the overhead associated with determining if a route of interest in a routing table has changed. In accordance with an embodiment of the present invention, a routing table 200 is provided as is illustrated by FIG. 2. The routing table comprises, for each route entry, the conventional route number 101 and other information 102 as well as a sequence number 103. In addition, each route table entry comprises a list of pointers to checksums for a registration sets 203. The pointers point to registration set change fields 204 and 205 associated with registered protocol sets.

Each protocol may register with the router and indicate routes of interest. As a result of this registration, and the structure of the table provided in FIG. 2, protocols may determine if routes of interest in the routing table have changed. Referring to FIG. 3, the registration process 301 is described. Each protocol may register by identifying routes of interest 302. The routes of interest may be identified either by identifying protocols of interest (for example, when the OSPF routing protocol is registering, it may be interested in all changes to BGP routes and, thus specify BGP) or by identifying IP prefix/length pairs.

A registration set change field (such as field 204 and 205) is established for each registration set. In the described embodiment, the registration set change field is computed as a function of the sequence numbers for the routes selected for the set. In the described embodiment, a checksum function is utilized to compute the registration set change field. Use of an exclusive OR (XOR) function to compute the checksum is advantageous because the XOR function requires minimal computational power and, as will be discussed below, incremental checksumming may be utilized. Initially, the checksum for all routes in a set is computed by determining the checksum for all sequence numbers 103 for routes in the set. For example, in the table of FIG. 2, routes R1 and R2 comprise the OSPF set. The checksum of the sequence numbers for routes R1 and R2 is computed and stored as the OSPF checksum 204. Similarly, the BGP set checksum 205 is calculated as the checksum for routes R2–R5.

With reference to FIG. 4, whenever a route is changed 401, the sequence number 103 for the route is incremented 402. In one embodiment, the sequence number may be incremented by a one from the current sequence number in the route. In another embodiment, an overall sequence numbering scheme may be used for the entire table 200. In this embodiment, a master sequence number is incremented each time a route is changed and the new master sequence number is stored as the sequence number for the changed route. An advantage of this technique is that, when a process is checking if a route has changed since the last time the table was polled, the process must simply keep track of the highest sequence number encountered on the previous search of the table. If a route of interest has a sequence number higher that the highest sequence number encountered on the previous search, it is assumed that the route changed.

After incrementing the route number, a new checksum is computed for each set in the list of pointers 203, step 403. For example, if route R1 is changed, a new checksum is computed for the OSPF set checksum 204. In an embodiment utilizing the XOR function to compute the checksum, the new checksum value 205 is computed as the exclusive OR of the new sequence number 103 for route R1 and the original checksum value for OSPF set checksum 204. Thus, the new checksum may be computed incrementally without need to access the sequence numbers for all routes in the set.

If more pointers, are stored in the list of pointers 203 (as illustrated for example with route R2 which stores pointers to both the OSPF set checksum 204 and BGP set checksum 205), the process of computing a new checksum is carried out for the other sets in the list, step 404.

Turning now to FIG. 5, a method of examining the table 200 for changes to routes of interest is illustrated, 501. In a polled environment, periodically, each protocol checks the routing table 200 for changes to routes of interest. In an environment using an interrupt type mechanism, an interrupt may be generated each time the table is changed. In either event, the protocol has stored the checksum value for its registered set the previous time the table 200 was reviewed. The protocol now compares this stored checksum value with the checksum (e.g., 204 or 205) for the route set, 502. If the checksum is the same, no route of interest has changed. Otherwise, if they do not match, all routes of interest are examined to determine if their sequence number has changed since the last time the routes were examined, 504. As was discussed above, in an embodiment using a master sequence number, the highest sequence number found the last time the table was examined is stored and a check is made to determine if any route of interest has a higher sequence number. If it does, the route has changed.

It might be noted that an embodiment of the invention has been described which utilizes sequence numbers 203. In alternative embodiment other information may be stored for the routes which indicates the route entry has changed. Thus, these values will sometimes be termed more generally "change values".

ALTERNATIVES TO THE PREFERRED EMBODIMENT OF THE PRESENT INVENTION

There are, of course, alternatives to the described embodiment which are within the reach of one of ordinary skill in the relevant art. The present invention is intended to be limited only by the claims presented below.

What is claimed is:

1. A method of maintaining a routing table in a router, the routing table including a first plurality of route entries, the method comprising:

a) accepting registration by a first routing protocol, the registration including identification of routes of interest; and b) establishing a registration set change field associated with the registration and with a second plurality of route entries for indication of changes in the routes of interest.

2. The method as recited by claim 1 wherein each of the route entries have an associated sequence number.

3. The method as recited by claim 2 wherein the registration set change field is computed as a function of the sequence numbers for each of the route entries.

4. The method as recited by claim 3 wherein the function is an exclusive OR function.

5. The method as recited by claim 1 wherein the routes of interest are identified by protocol type.

6. The method as recited by claim 1 wherein the routes of interest are identified by IP prefix.

7. A method of indicating that a route entry in a route table has been updated comprising:

a) incrementing a route sequence number for the route entry;

b) walking a list of pointers associated with the route entry, the pointers pointing to checksum fields associated with the route entry, a checksum field being associated with a plurality of route entries; and c) for each checksum value, recompute the checksum as a function of the sequence number and the original checksum value.

8. The method as recited by claim 7 wherein the function is an exclusive OR function.

9. A method of determining if a route of interest in a route table has been changed comprising:

a) comparing a registration set change field for a plurality of routes of interest with a stored registration set change field value; and b) if the registration set change field values match, assume no route of interest has changed and, otherwise, examining change values associated with each of the plurality of routes of interest to determine if the route of interest has changed.

10. The method as recited by claim 9 wherein the change values are sequence numbers.

11. The method as recited by claim 9 wherein the method is carried out on a periodic polling basis.

12. The method as recited by claim 9 wherein the method is carried in response to an interrupt.

\* \* \* \* \*